United States Patent
Shibata et al.

(10) Patent No.: US 11,280,949 B2
(45) Date of Patent: Mar. 22, 2022

(54) LIGHT-EMITTING DEVICE

(71) Applicant: Panasonic Intellectual Property Management Co., Ltd., Osaka (JP)

(72) Inventors: Yudai Shibata, Hyogo (JP); Takeshi Abe, Osaka (JP); Shogo Motegi, Osaka (JP); Shintaro Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/100,297

(22) Filed: Nov. 20, 2020

(65) Prior Publication Data

US 2021/0165153 A1 Jun. 3, 2021

(30) Foreign Application Priority Data

Nov. 28, 2019 (JP) .............................. JP2019-215034

(51) Int. Cl.
*G02B 6/32* (2006.01)
*F21V 8/00* (2006.01)
(Continued)

(52) U.S. Cl.
CPC .............. *G02B 6/0006* (2013.01); *F21V 9/30* (2018.02); *G02B 6/0008* (2013.01); *G02B 6/32* (2013.01);
(Continued)

(58) Field of Classification Search
None
See application file for complete search history.

(56) References Cited

U.S. PATENT DOCUMENTS

| 4,526,467 A | 7/1985 | Fantone |
| 5,238,809 A | 8/1993 | Wolfbeis |
(Continued)

FOREIGN PATENT DOCUMENTS

| DE | 37 01 833 A1 | 8/1987 |
| DE | 10 2007 014 871 A1 | 10/2008 |
(Continued)

OTHER PUBLICATIONS

Office Action (including English Language Translation), dated Jan. 24, 2022 by the German Patent and Trade Mark Office, for the corresponding German Patent Application No. 10 2020 130 848.5.

*Primary Examiner* — Chad H Smith
(74) *Attorney, Agent, or Firm* — Greenblum & Bernstein, P.L.C.

(57) ABSTRACT

A light-emitting device includes: a laser light source that radiates blue-based light as primary light; a wavelength converting member that emits secondary light, the secondary light including wavelength-converted light, the wavelength-converted light being the primary light converted into light having more long-wavelength components than the primary light; a first light-guiding member that transmits the secondary light emitted by the wavelength converting member; and a second light-guiding member which includes a resin material, and transmits the secondary light transmitted by the first light-guiding member, and the first light-guiding member and the second light-guiding member are connected by a connector, the connector including a numerical aperture (NA) converting member that optically connects a transmission path in the first light-guiding member and a transmission path in the second light-guiding member.

7 Claims, 4 Drawing Sheets

(51) Int. Cl.
- *F21V 9/30* (2018.01)
- *G02B 6/36* (2006.01)
- *F21V 23/00* (2015.01)
- *G02B 23/24* (2006.01)

(52) U.S. Cl.
CPC .......... *G02B 6/3624* (2013.01); *F21V 23/003* (2013.01); *G02B 23/2469* (2013.01)

(56) References Cited

U.S. PATENT DOCUMENTS

| | | |
|---|---|---|
| 5,898,802 A | 4/1999 | Chen et al. |
| 2002/0001140 A1 | 1/2002 | Heimer |
| 2008/0239748 A1 | 10/2008 | Hatzenbuehler et al. |
| 2009/0040598 A1* | 2/2009 | Ito .................. A61B 1/0669 |
| | | 359/332 |
| 2018/0317757 A1 | 11/2018 | Hayashi |

FOREIGN PATENT DOCUMENTS

| | | | |
|---|---|---|---|
| JP | 2013-214408 A | 10/2013 | |
| JP | 6161877 B2 | 7/2017 | |
| JP | 2018-190594 A | 11/2018 | |
| WO | WO-2016079808 A1 * | 5/2016 | ......... A61B 1/00126 |

\* cited by examiner

LIGHT-EMITTING DEVICE

CROSS REFERENCE TO RELATED APPLICATION

This application claims the benefit of priority of Japanese Patent Application Number 2019-215034, filed on Nov. 28, 2019, the entire content of which is hereby incorporated by reference.

TECHNICAL FIELD

The present disclosure relates to a light-emitting device.

BACKGROUND ART

Conventionally, light-emitting devices each including a plurality of optical fibers that are flexible and guide excitation light emitted from a plurality of excitation light sources, a multimode fiber that guides the excitation light guided through the plurality of optical fibers, and a light-emitting unit that emits fluorescence by receiving the excitation light guided through the multimode fiber have been disclosed.

CITATION LIST

Patent Literature

[PTL 1] Japanese Patent No. 6161877

SUMMARY

Technical Problem

Optical fibers and multimode fibers in conventional light-emitting devices usually include glass fiber yarn. This makes the conventional light-emitting devices expensive, and thus a reduction in costs is desired. For this reason, the use of inexpensive resin materials such as plastic for the optical fibers and the multimode fibers can be contemplated. However, such a resin material cannot tolerate heat produced by heat generation sources, such as excitation light sources, and this makes it difficult to apply such a resin material to light-emitting devices.

In view of the above, the present disclosure aims to provide a light-emitting device that can reduce an effect of heat produced by a heat generation source while reducing a rise in cost.

Solution to Problem

A light-emitting device according to an aspect of the present disclosure includes: a solid-state light-emitting element that radiates blue-based light as primary light; a wavelength converting member that emits secondary light, the secondary light including wavelength-converted light, the wavelength-converted light being the primary light converted into light having more long-wavelength components than the primary light; a first light-guiding member that transmits the secondary light emitted by the wavelength converting member; and a second light-guiding member which includes a resin material, and transmits the secondary light transmitted by the first light-guiding member. The first light-guiding member and the second light-guiding member are connected by a connector, the connector including a numerical aperture (NA) converting member that optically connects a transmission path in the first light-guiding member and a transmission path in the second light-guiding member.

It should be noted that this comprehensive or concrete aspect of the present disclosure may be realized by optionally combining a system, a method, or an integrated circuit.

Advantageous Effect

A light-emitting device according to the present disclosure can reduce an effect of heat produced by a heat generation source while reducing a rise in cost.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, embodiments according to the present disclosure will be described with reference to the drawings. The embodiments described below each show an example of the present disclosure. Therefore, numerical values, shapes, materials, structural elements, the arrangement and connection of the elements, etc. presented in the embodiments below are mere examples and do not limit the present disclosure. Furthermore, among the structural elements in the embodiments below, those not recited in any one of the independent claims will be described as optional structural elements.

It should be noted that the drawings are schematic diagrams, and do not necessarily provide strictly accurate illustrations. Throughout the drawings, the same reference numeral is given to the same structural components.

Moreover, the embodiments described below use an expression such as substantially plane-shaped. For example, substantially plane-shaped not only means that which is perfectly plane-shaped, but also means that which is practically plane-shaped. In addition, the substantially plane-shaped is considered as plane-shaped within the scope in which an advantageous effect can be produced by the present disclosure. The same applies to other expressions using "substantially".

Hereinafter, a light-emitting device according to an embodiment of the present disclosure will be described.

Embodiment

[Configuration: Light-Emitting Device 1]

Figure 1:
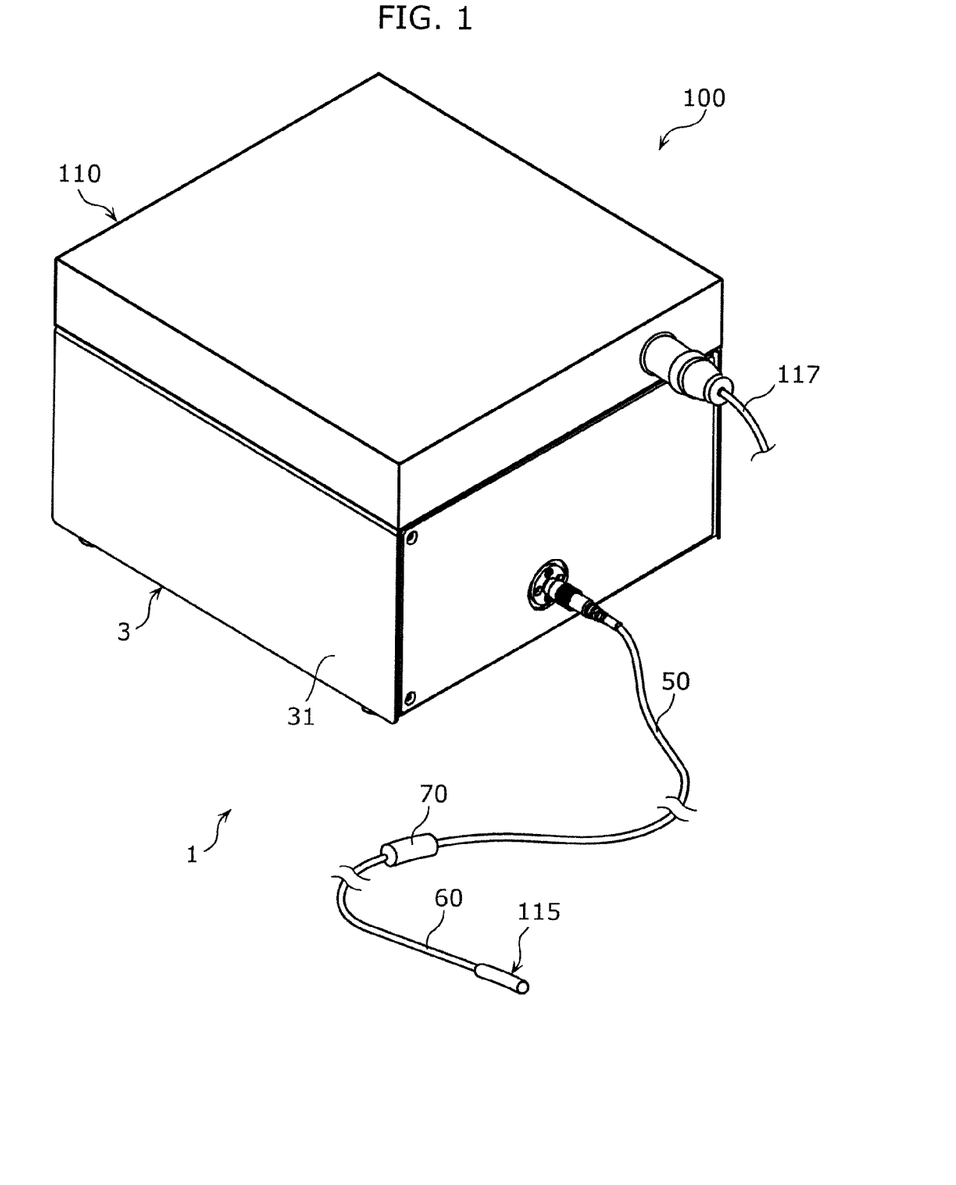
FIG. 1 is a perspective view illustrating a lighting system for an endoscope which includes a light-emitting device according to an embodiment.

FIG. 1 is a perspective view illustrating lighting system for endoscope 100 which includes light-emitting device 1 according to an embodiment.

As illustrated in FIG. 1, light-emitting device 1 according to the embodiment is a reflective lighting device that uses laser light, and included in, for example, lighting system for endoscope 100 which is used for an endoscope. It should be noted that light-emitting device 1 may be used for, for example, a downlight, a spotlight, and the like. Lighting system for endoscope 100 includes light-emitting device 1 and camera control unit 110.

Laser light that light-emitting device 1 emits is blue-based light, for example. Light-emitting device 1 emits laser light that is blue-based light and quasi-white secondary light that is produced by combining a portion of the absorbed laser light and green to yellow wavelength-converted light.

Figure 2:
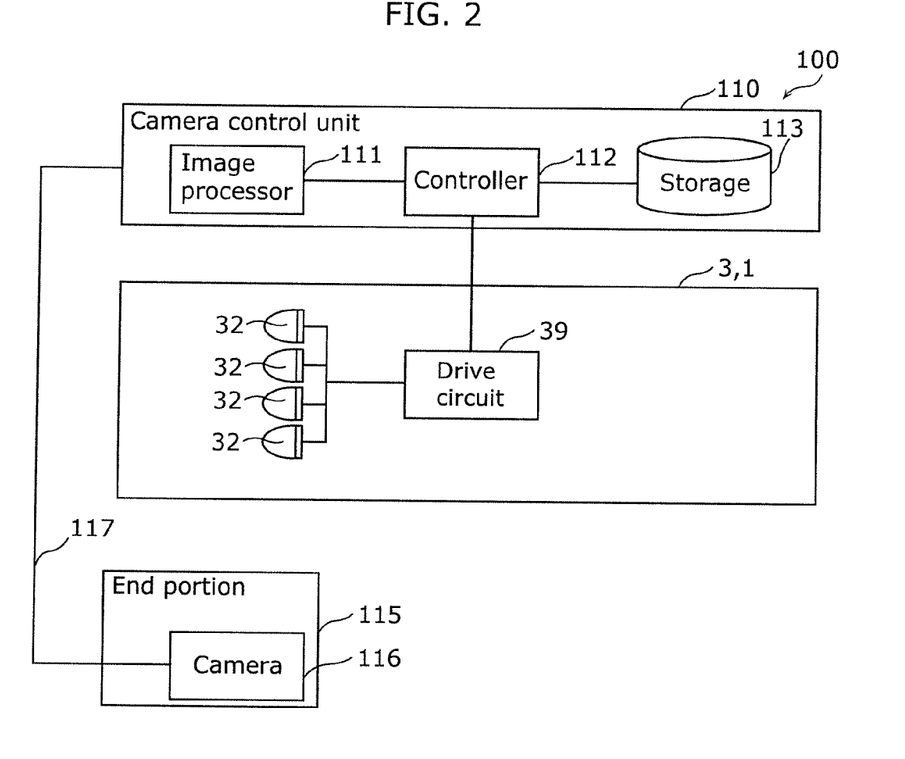
FIG. 2 is a block diagram illustrating the light-emitting device according to the embodiment.
Figure 3:
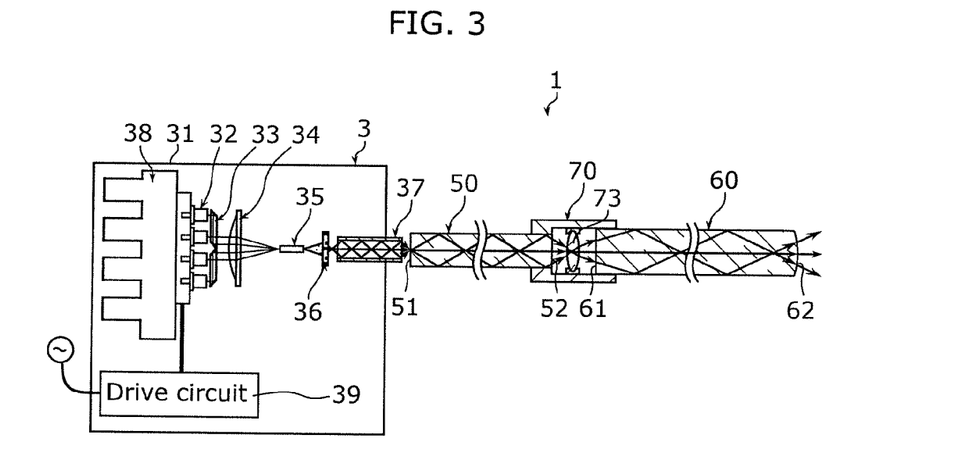
FIG. 3 is diagram schematically illustrating the light-emitting device, a first light-guiding member, a connector, and a second light-guiding member according to the embodiment.

FIG. 2 is a block diagram illustrating light-emitting device 1 according to the embodiment. FIG. 3 is a diagram schematically illustrating light-emitting device 1, first light-guiding member 50, connector 70, and second light-guiding member 60 according to the embodiment.

As illustrated in FIG. 2 and FIG. 3, light-emitting device 1 includes excitation light source 3, first light-guiding member 50, second light-guiding member 60, and connector 70.

[Excitation Light Source 3]

Excitation light source 3 is a device that emits laser light. Excitation light source 3 includes housing body 31, one or more laser light sources 32, prism 33, condenser lens 34, first glass rod 35, wavelength converting member 36, second glass rod 37, heat sink 38, and drive circuit 39.

Housing body 31 is a case of excitation light source 3. Housing body 31 houses laser light source 32, prism 33, condenser lens 34, first glass rod 35, heat sink 38, and drive circuit 39. In addition, housing body 31 holds wavelength converting member 36 such that wavelength converting member 36 is optically connectable with each of first glass rod 35 and second glass rod 37.

Laser light source 32 is a solid-state light-emitting element that radiates laser light as primary light, and emits substantially collimated laser light. Laser light source 32 is attached to a substrate, and is thermally connected to heat sink 38 via the substrate. In this embodiment, excitation light source 3 uses a plurality of laser light sources 32, and the plurality of laser light sources 32 are considered as one set. Each of the one set of laser light sources 32 emits laser light, and the laser light is caused to enter wavelength converting member 36 via prism 33 and first glass rod 35.

It should be noted that although a plurality of laser light sources 32 (e.g. four or eight laser light sources 32) are used in this embodiment, only one laser light source 32 may be used. Laser light that laser light source 32 emits in this embodiment is light having a predetermined wavelength within a wavelength band of blue-based light that includes purple to blue.

Laser light that laser light source 32 emits in this embodiment has a cross-sectional shape that is oval and 1 mm×4 mm in size. In addition, energy distribution of the laser light is in accordance with the Gaussian distribution.

In addition, although the one set of laser light sources 32 is used in this embodiment, a plurality of sets of laser light sources 32 may be used. In this case, prism 33 and condenser lens 34 may be provided as a pair corresponding to each set of laser light sources 32.

Although laser light source 32 is a semiconductor laser which is, for example, an InGaN-based laser diode, laser light source 32 may be a semiconductor laser that emits light in a different wavelength (other than the wavelength band of blue-based light) or a light emitting diode (LED), so long as light emitted can excite wavelength converting member 36.

In addition, laser light source 32 outputs laser light under the control of drive circuit 39. That is, laser light source 32 emits a desired laser light under the control of drive circuit 39.

Prism 33 is disposed in housing body 31 such that laser light emitted by the one set of laser light sources 32 is guided to condenser lens 34 to be condensed onto condenser lens 34. That is, prism 33 condenses the laser light emitted from laser light sources 32 so that the condensed laser light enters condenser lens 34. Prism 33 is, for example, a rhomboid prism, a polarizing mirror, etc.

Condenser lens 34 is disposed in housing body 31 so as to be located opposite prism 33. Condenser lens 34 further condenses the laser light exited from prism 33, and causes the laser light to enter first glass rod 35. It should be noted that condenser lens 34 is a spherical lens or an aspheric lens, but condenser lens 34 need not be the lenses indicated above so long as condenser lens 34 is an optical device that can condense laser light and can cause the laser light to enter first glass rod 35.

First glass rod 35 is disposed in housing body 31 so as to be located opposite condenser lens 34. First glass rod 35 is a light pipe that includes glass as a base material and has the inner surface that is coated with a dielectric multilayer so as to highly efficiently reflect laser light that is condensed by and exited from condenser lens 34. It should be noted that first glass rod 35 may be a light pipe having a metallically-coated surface inside so as to highly efficiently reflect the laser light.

First glass rod 35 constitutes a transmission path that transmits the laser light condensed by and exited from condenser lens 34. First glass rod 35 mixes the laser light by causing the laser light to repeatedly reflect inside while the laser light is guided through first glass rod 35 to even out the Gaussian distribution. That is, tophat laser light whose peak portion is smoothed (substantially evened out) is caused to exit from first glass rod 35. First glass rod 35 emits laser light that is mixed, and causes the mixed laser light to enter wavelength converting member 36.

When the transmission path in first glass rod 35 is cut on a plane that is perpendicular to a direction in which the laser light transmits, a cross section of the transmission path is polygonally shaped. In this embodiment, a cross section of the transmission path is quadrilaterally shaped.

Wavelength converting member 36 includes phosphor (wavelength converting element) that converts the laser light that is mixed by first glass rod 35 into wavelength-converted light (fluorescence). That is, wavelength converting member 36 performs wavelength conversion on laser light entered from a first glass rod 35-side face, and emits secondary light that includes wavelength-converted light on which the wavelength conversion is performed from the opposite face (second glass rod 37-side face). Specifically, wavelength converting member 36 emits secondary light that includes laser light as primary light and wavelength-converted light that is the laser light as primary light converted into light having more long-wavelength components than the primary light (the proportion of the long-wavelength component is high), and causes the secondary light to enter second glass rod 37.

In addition, tophat laser light enters wavelength converting member 36. Accordingly, wavelength converting member 36 emits secondary light having reduced luminance irregularity in which only a portion of wavelength converting member 36 is brightly illuminated.

In wavelength converting member 36, the phosphor is dispersed in a binder that is a transparent material including ceramic such as glass, silicone resin, or the like. The phosphor is, for example, multicolor phosphor such as ZnO, an yttrium aluminum garnet (YAG)-based phosphor, a CASN-based phosphor, a SCASN-based phosphor, or a barium, magnesium, aluminum (BAM)-based phosphor, and is selected as appropriate according to a type of laser light. It should be noted that the binder is not limited to include ceramic, silicone resin, or the like, and other transparent materials such as transparent glass, or the like, may be used.

In addition, the phosphor may be a red phosphor, a green phosphor, a blue phosphor, etc., and wavelength-converted light, such as red light, green light, and blue light, may be emitted according to the laser light. In this case, these red, green, and blue wavelength-converted lights may be combined to produce white light. In this embodiment, the phosphor emits quasi-white secondary light.

In addition, wavelength converting member 36 is a flat plate-shaped structure in which a phosphor layer etc. are disposed on a sapphire substrate, for example. Wavelength converting member 36 is fixed to housing body 31 in a state in which wavelength converting member 36 is in contact with housing body 31. That is, wavelength converting member 36 dissipates heat produced in the phosphor by causing housing body 31 to function as heat sink 38.

Second glass rod 37 is fixed to housing body 31, and optically connects wavelength converting member 36 and first light-guiding member 50. Second glass rod 37 is disposed so as to be located opposite wavelength converting member 36. Second glass rod 37 is a light pipe that includes glass as a base material, and has the inner surface that is coated with a dielectric multilayer so as to highly efficiently reflect secondary light that is exited from wavelength converting member 36. It should be noted that second glass rod 37 may be a light pipe having a metallically-coated surface inside so as to highly efficiently reflect the secondary light.

It should be noted that second glass rod 37 may have the same configuration as first glass rod 35, but second glass rod 37 may be provided with a reflective film inside which enhances transmission efficiency of white light.

Second glass rod 37 constitutes a transmission path that transmits secondary light including wavelength-converted light whose wavelength is converted and which is emitted by wavelength converting member 36. Second glass rod 37 causes the secondary light to repeatedly reflect inside while the secondary light is guided through second glass rod 37. Second glass rod 37 mixes the secondary light while the secondary light is guided through second glass rod 37 to emit secondary light whose Gaussian distribution is evened out. That is, second glass rod 37 emits tophat secondary light whose peak portion is smoothed. Second glass rod 37 emits the mixed secondary light, and causes the mixed secondary light to enter first light-guiding member 50.

When the transmission path in second glass rod 37 is cut on a plane that is perpendicular to a direction in which the secondary light transmits, a cross section of the transmission path is polygonally shaped. In this embodiment, second glass rod 37 has the transmission path whose cross section is quadrilaterally shaped.

Heat sink 38 is a heat dissipation member for dissipating heat produced in laser light sources 32, and includes a plurality of fins. In addition, the substrate to which laser light sources 32 are attached is fixed by heat sink 38.

Drive circuit 39 is electrically connected with an electric power system via an electric power line etc., and supplies electric power to each laser light source 32. In addition, laser light sources 32 output laser light under the control of drive circuit 39 such that laser light sources 32 emit predetermined laser light.

Drive circuit 39 may have a function of modulating laser light that laser light sources 32 emit. In addition, drive circuit 39 may include, for example, an oscillator that drives laser light sources 32 based on a pulse signal.

[First Light-Guiding Member 50]

First light-guiding member 50 is an optical fiber cable that transmits secondary light exited from wavelength converting member 36. First light-guiding member 50 has a dual structure in which a core having a high refractive index is surrounded with a clad layer having a refractive index lower than that of the core, and includes a cladding that covers the clad layer, for example. It should be noted that when light-emitting device 1 includes a plurality of sets of laser light sources 32, a plurality of first light-guiding members 50 may also be provided.

First light-guiding member 50 includes a material, such as glass having high heat resistance or resin having excellent heat resistance. This enables laser light exited from second glass rod 37 to enter first light-guiding member 50.

In the embodiment, first light-guiding member 50 is a bundle fiber consists of multi-component glass fibers each of which is approximately 25 μm to 50 μm in diameter and which are bundled together and bonded with adhesive. In addition, in this embodiment, the diameter of first light-guiding member 50 is approximately 0.1 mm to 0.4 mm, and the numerical aperture of first light-guiding member 50 is 0.8 to 0.9.

First light-guiding member 50 has one end on a second glass rod 37 side which is optically connected with and fixed to second glass rod 37 and from which secondary light exited from wavelength converting member 36 enters. In addition, first light-guiding member 50 has the other end that is on a side opposite the second glass rod 37 side, and is removably fixed to connector 70.

Specifically, first light-guiding member 50 has entrance face 51 from which secondary light enters, and exit face 52 from which the secondary light entered from entrance face 51 and guided through first light-guiding member 50 exits.

Entrance face 51 is substantially plane-shaped and is one end face of first light-guiding member 50. Entrance face 51 is disposed so as to be located opposite second glass rod 37. First light-guiding member 50 is disposed such that the central axis of entrance face 51 substantially aligns with the central axis of the transmission path in second glass rod 37. In addition, exit face 52 is substantially plane-shaped and is the other end face of first light-guiding member 50. Exit face 62 is disposed so as to be located opposite first light-guiding member 50 via connector 70.

Figure 4:
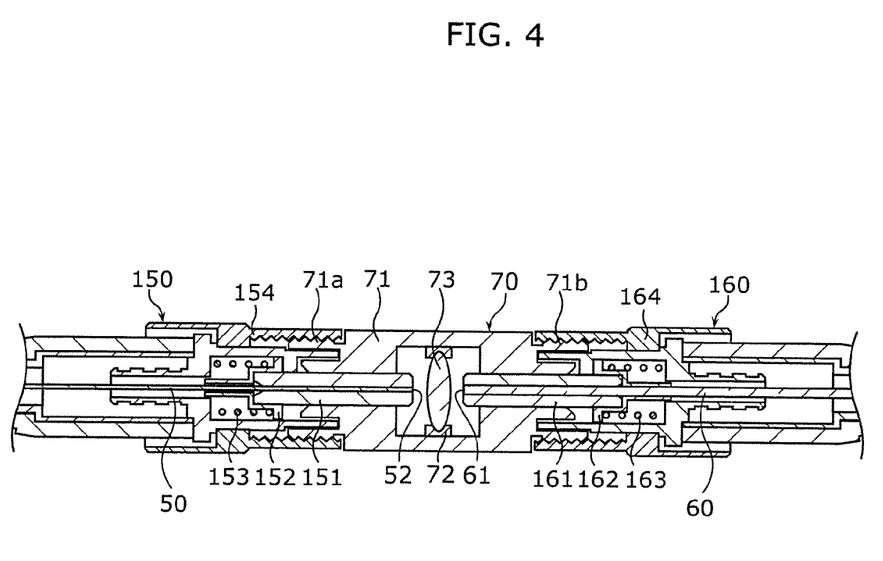
FIG. 4 is a partially enlarged cross sectional view illustrating the first light-guiding member, the connector, and the second light-guiding member according to the embodiment.

FIG. 4 is a partially enlarged cross sectional view illustrating first light-guiding member 50, connector 70, and second light-guiding member 60 according to the embodiment.

As illustrated in FIG. 4, first light-guiding member 50 includes, on the other end, connecting terminal 150 that is mechanically connected with connector 70. Connecting terminal 150 includes ferrule 151, housing 154, flange 152, and spring 153.

Ferrule 151 includes zirconia, nickel, etc., and is an aligning component that holds first light-guiding member 50 in a predetermined orientation, for example. Ferrule 151 includes an insertion hole in which an end of first light-guiding member 50 is inserted. The end is on a side opposite a second glass rod 37 (excitation light source 3) side. The end of first light-guiding member 50 which is inserted in the insertion hole is an end on a connector 70 side. In addition, when connecting terminal 150 is connected to connector 70, ferrule 151 is inserted in case 71 of connector 70, and is held so as to be located opposite numerical aperture (NA) converting member 73 of connector 70 and adjacent to NA converting member 73. Accordingly, ferrule 151 holds the end of first light-guiding member 50 in such a manner that exit face 52 of first light-guiding member 50 and NA converting member 73 face and are adjacent to each other. Ferrule 151 is an example of a first ferrule.

Housing 154 holds ferrule 151, and has a tubular shape that forms the outline of connecting terminal 150. Housing 154 houses flange 152, spring 153, etc. Housing 154 is engaged with and fixed to connection portion to be connected 71a in case 71 of connector 70. In this embodiment, a female screw portion is formed in housing 154, and a male screw portion is formed in connection portion to be connected 71a in case 71 of connector 70, and thus housing 154 is being screwed and coupled to connection portion to be connected 71a.

Flange 152 is held by housing 154 in a state in which flange 152 is connected to one end portion of ferrule 151. In addition, flange 152 receives stress from spring 153 by being connected to spring 153, and this energizes ferrule 151 to a direction to which the stress is applied.

Spring 153 is disposed between flange 152 and housing 154. When connecting terminal 150 is connected to connector 70, spring 153 energizes ferrule 151 toward an NA converting member 73 side via flange 152. When housing 154 is coupled to connection portion to be connected 71a, spring 153 applies stress to flange 152 by being pushed by housing 154, and presses ferrule 151 to the NA converting member 73 side.

It should be noted that the coupling of first light-guiding member 50 and connector 70 is not limited to the above-described details. The other end of first light-guiding member 50 may simply be fixed with a fixing member such as a screw.

[Second Light-Guiding Member 60]

Second light-guiding member 60 is an optical fiber cable that transmits secondary light exited from wavelength converting member 36. Second light-guiding member 60 has a dual structure in which a core having a high refractive index is surrounded with a clad layer having a refractive index lower than that of the core, and includes a cladding that covers the clad layer, for example. It should be noted that when light-emitting device 1 includes a plurality of sets of laser light sources 32, a plurality of second light-guiding members 60 may also be provided.

Second light-guiding member 60 includes a material different from a material which first light-guiding member 50 includes. Second light-guiding member 60 includes, for example, a light-transmissive resin material. In this embodiment, the diameter of second light-guiding member 60 is 0.4 mm to 3 mm, and the numerical aperture of second light-guiding member 60 is 0.5 to 0.7.

Figure 5:
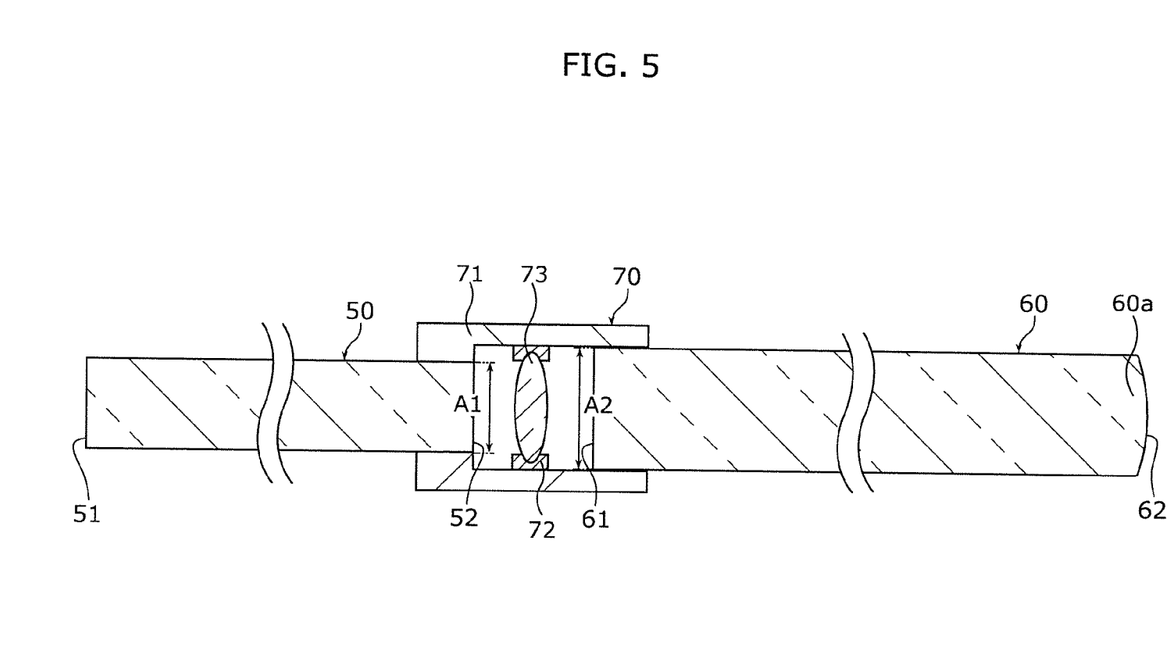
FIG. 5 is a diagram schematically illustrating a relationship between the first light-guiding member, the connector, and the second light-guiding member according to the embodiment.

FIG. 5 is a diagram schematically illustrating a relationship between first light-guiding member 50, connector 70, and second light-guiding member 60 according to the embodiment.

As illustrated in FIG. 5, the transmission path of secondary light in second light-guiding member 60 has diameter A2 that is greater than diameter A1 of the transmission path of the secondary light in first light-guiding member 50. That is, the average diameter of second light-guiding member 60 is greater than the average diameter of first light-guiding member 50. Accordingly, entrance face 61 of second light-guiding member 60, which will be described later, is greater than exit face 52 of first light-guiding member 50.

Although the area of exit face 52 of first light-guiding member 50 is smaller than that of entrance face 61 of second light-guiding member 60, first light-guiding member 50 has the numerical aperture greater than that of second light-guiding member 60. Accordingly, by making diameter A2 of entrance face 61 of second light-guiding member 60 greater than diameter A1 of exit face 52 of first light-guiding member 50, the decrease in light transmission efficiency at the time of optically connecting first light-guiding member 50 and second light-guiding member 60 is reduced, when first light-guiding member 50 and second light-guiding member 60 are optically connected with each other.

As illustrated in FIG. 4, second light-guiding member 60 has one end that is on a first light-guiding member 50 side, and is removably fixed to connector 70. Second light-guiding member 60 is optically connected with first light-guiding member 50 via connector 70. Secondary light that is exited from wavelength converting member 36 and guided through first light-guiding member 50 enters second light-guiding member 60.

Specifically, second light-guiding member 60 has entrance face 61 from which the secondary light enters, and exit face 62 from which the secondary light that is entered from entrance face 61 and guided through second light-guiding member 60 exits.

Entrance face 61 is substantially plane-shaped, and is one end face of second light-guiding member 60. Entrance face 61 is disposed so as to be located opposite second glass rod 37. Second light-guiding member 60 may be disposed such that the center of entrance face 61 is within the central axis of the transmission path in second glass rod 37, for example. In addition, exit face 62 is substantially plane-shaped, and is the other end face of second light-guiding member 60. Exit face 52 is disposed so as to be located opposite second light-guiding member 60 via connector 70.

In addition, as illustrated in FIG. 5, second light-guiding member 60 includes light distribution control structure 60a that performs light distribution control on secondary light transmitted by first light-guiding member 50 before emitting the secondary light.

Light distribution control structure 60a is disposed on the other end face of second light-guiding member 60. In this embodiment, light distribution control structure 60a is integrally formed on the other end face of second light-guiding member 60, and includes exit face 62 of second light-guiding member 60. Light distribution control structure 60a in this embodiment is in a shape of a convex portion of a hemispherical shape.

An angle of radiation of secondary light that is exited from light distribution control structure 60a is specified according to an angle of view of camera 116. That is, the numerical aperture of light distribution control structure 60a is specified according to an angle of view of camera 116. An angle of radiation of the secondary light that is exited from light distribution control structure 60a may be equivalent to an angle of view of camera 116.

Light distribution control structure 60a is obtained by melting the other end face of second light-guiding member 60 to form a curved surface having a desired curvature, or obtained by grinding the other end face of second light-guiding member 60 to form a curved surface having a desired curvature, for example. The curvature according to the embodiment is approximately 20 mm, for example.

It should be noted that light distribution control structure 60a is integrally formed with second light-guiding member 60, but light distribution control structure 60a may be a member separated from second light-guiding member 60. That is, light distribution control structure 60a may be a convex lens, a concave lens, or the like. In this case, light distribution control structure 60a is located opposite the other end face of second light-guiding member 60, and is held in end portion 115 illustrated in FIG. 1 in an orientation in which light distribution control is to be performed on secondary light exited from the other end face of second light-guiding member 60.

In addition, second light-guiding member 60 includes, on the other end, connecting terminal 160 that is mechanically connected with connector 70. Connecting terminal 160 includes ferrule 161, housing 164, flange 162, and spring 163. Since connecting terminal 160 included in second light-guiding member 60 has the same configuration as connecting terminal 150 included in first light-guiding member 50 which includes ferrule 151, housing 154, flange 152, and spring 153, descriptions of ferrule 161, housing 164, flange 162, and spring 163 are omitted. Ferrule 161 is an example of a second ferrule.

[Connector 70]

Connector 70 is an optical connector that optically connects the transmission path in first light-guiding member 50 and the transmission path in second light-guiding member 60 for converting the difference between the numerical aperture of first light-guiding member 50 and the numerical aperture of second light-guiding member 60. First light-guiding member 50 and second light-guiding member 60 have different diameters and include different materials. Specifically, connector 70 optically connects connecting terminal 150 (the other end portion on an exit face 52 side of first light-guiding member 50) of first light-guiding member 50 and connecting terminal 160 (one end portion on an exit face 62 side of second light-guiding member 60) of second light-guiding member 60.

Connector 70 includes case 71, support portion 72, and NA converting member 73.

Case 71 has a tubular body shape having unclosed ends, and secondary light passes through the inside of case 71. Case 71 includes one end and the other end in which connection portion to be connected 71a and connection portion to be connected 71b are formed, respectively. First light-guiding member 50 that transmits secondary light is inserted in and connected to connection portion to be connected 71a in the one end of case 71. Second light-guiding member 60 that transmits the secondary light is inserted in and connected to connection portion to be connected 71b in the other end of case 71. Case 71 includes fixing members which are attached to case 71 and support first light-guiding member 50 and second light-guiding member 60. In addition, connection portion to be connected 71a in the one end of case 71 has the same configuration as connection portion to be connected 71b in the other end of case 71.

Case 71 is light-transmissive. Case 71 includes a metal material, such as aluminum, iron, or the like.

Support portion 72 is housed and held inside case 71, and supports NA converting member 73. Support portion 72 holds NA converting member 73 such that NA converting member 73 is oriented facing exit face 52 of first light-guiding member 50 and entrance face 61 of second light-guiding member 60.

NA converting member 73 is a convex lens, a concave lens, a parabola mirror, or the like. NA converting member 73 is disposed in the transmission path between first light-guiding member 50 and second light-guiding member 60. In other words, NA converting member 73 is disposed between exit face 52 of first light-guiding member 50 and entrance face 61 of second light-guiding member 60.

Specifically, NA converting member 73 is supported by support portion 72 of connector 70 in an orientation in which NA converting member 73 causes secondary light exited from exit face 52 of first light-guiding member 50 to enter entrance face 61 of second light-guiding member 60. NA converting member 73 is held inside support portion 72 such that the central axis of NA converting member 73 substantially aligns with the central axis of exit face 52 of first light-guiding member 50 and the central axis of entrance face 61 of second light-guiding member 60.

Since first light-guiding member 50 includes glass and second light-guiding member 60 includes a resin material in this embodiment, the embodiment has a characteristic in which the numerical aperture of first light-guiding member 50 (angle of radiation of light exited from first light-guiding member 50) is greater than the numerical aperture of second light-guiding member 60 (angle of radiation of light exited from second light-guiding member 60). In order to cause secondary light guided to be reflected at an interface between the core and the clad layer in second light-guiding member 60, NA converting member 73 causes secondary light that is exited from exit face 52 of first light-guiding member 50 to be substantially collimated, and causes the substantially collimated secondary light to enter entrance face 61 of second light-guiding member 60.

[Camera Control Unit 110]

Camera control unit 110 is a unit that processes images imaged by camera 116 provided in end portion 115. Camera control unit 110 includes, for example, image processor 111, controller 112, and storage 113.

Although not illustrated, the other end of second light-guiding member 60 and the other end of image transmission cable 117 are connected to end portion 115. Camera 116 that images a subject is included in end portion 115.

Camera 116 is, for example, a charge-coupled device (CCD) camera. Camera 116 transmits an image signal in which a subject is imaged to image processor 111 included in camera control unit 110 via video transmission cable 117. In image processor 111, image processing is performed as appropriate after the inputted image signal is converted into image data, and desired image information for output is generated. Then, the obtained image information is displayed on a display, which is not illustrated, via controller 112, as an examination image of an endoscope. In addition, controller 112 stores, as necessary, the image information in storage 113 which includes a memory, or the like.

[Operation]

In such light-emitting device 1, secondary light emitted from excitation light source 3 enters first light-guiding member 50, is guided through the inside of first light-guiding member 50, exits from exit face 52 of first light-guiding member 50, and enters NA converting member 73 of connector 70. The secondary light that entered NA converting member 73 penetrates through NA converting member 73, exits from NA converting member 73, and enters entrance face 61 of second light-guiding member 60. Then, the secondary light enters second light-guiding member 60, is guided through the inside of second light-guiding member 60, is guided to exit face 62 of second light-guiding member 60 which is disposed in end portion 115, and exits from exit face 62 of second light-guiding member 60. In this way, a subject can be illuminated by the secondary light that is emitted on the subject. Accordingly, it is possible to understand a state of the subject by camera 116 imaging the subject on which the secondary light is emitted.

Advantageous Effect

Next, advantageous effects which light-emitting device 1 according to the embodiment demonstrate will be described.

As has been described above, light-emitting device 1 according to the embodiment includes: laser light source 32 (solid-state light-emitting element) that radiates blue-based light as primary light; wavelength converting member 36 that emits secondary light, the secondary light including wavelength-converted light, the wavelength-converted light being the primary light converted into light having more long-wavelength components than the primary light; first light-guiding member 50 that transmits the secondary light emitted by wavelength converting member 36; and second light-guiding member 60 which includes a resin material, and transmits the secondary light transmitted by first light-guiding member 50. First light-guiding member 50 and second light-guiding member 60 are connected by connector 70. Connector 70 incudes NA converting member 73 that optically connects a transmission path in first light-guiding member 50 and a transmission path in second light-guiding member 60.

With this, a rise in cost of manufacturing second light-guiding member 60 can be reduced, compared to a case in which second light-guiding member 60 includes an expensive material such as glass fiber yarn.

In addition, since the secondary light enters second light-guiding member 60 via first light-guiding member 50, second light-guiding member 60 is provided apart from laser light source 32. For this reason, second light-guiding member 60 can reduce an effect of heat produced by laser light source 32 that is a heat generation source.

Therefore, in light-emitting device 1, it is possible to reduce an effect of heat produced by the heat generation source while reducing a rise in cost.

Particularly, when light-emitting device 1 is used for an endoscope, second light-guiding member 60 is desired to be disposable for preventing infectious diseases since second light-guiding member 60 is inserted in, for example, a human body. For this reason, light-emitting device 1 according to the embodiment is suitable for an endoscope.

In addition, in light-emitting device 1 according to the embodiment, the transmission path of the secondary light in second light-guiding member 60 has a diameter greater than a diameter of the transmission path of the secondary light in first light-guiding member 50.

With this, it is possible to cause the secondary light that is guided through first light-guiding member 50 to efficiently enter second light-guiding member 60. For this reason, it is possible to reduce a decrease in the light transmission efficiency in connector 70, that is a component optically connecting first light-guiding member 50 and second light-guiding member 60.

In addition, in light-emitting device 1 according to the embodiment, second light-guiding member 60 includes light distribution control structure 60*a* for performing light distribution control on the secondary light transmitted by first light-guiding member 50 before emitting the secondary light.

With this, when camera 116 is disposed in the vicinity of light distribution control structure 60*a*, the secondary light exited from second light-guiding member 60 can be adjusted to an angle of view of camera 116, by preparing light distribution control structure 60*a* to be adjusted to the angle of view of camera 116. For this reason, it is possible to reduce narrowing of the field of view of camera 116.

In addition, in light-emitting device 1 according to the embodiment, light distribution control structure 60*a* has a hemispherical shape.

With this, second light-guiding member 60 can emit, by simply changing curvature of light distribution control structure 60*a*, light on which light distribution control is performed according to an angle of view of camera 116.

In addition, in light-emitting device 1 according to the embodiment, NA converting member 73 is disposed between exit face 52 of first light-guiding member 50 and entrance face 61 of second light-guiding member 60, and supported by connector 70 in an orientation in which the secondary light exited from exit face 52 of first light-guiding member 50 is caused to enter entrance face 61 of second light-guiding member 60.

With this, NA converting member 73 can cause the secondary light exited from first light-guiding member 50 to stably enter second light-guiding member 60. For this reason, it is possible to more reliably reduce a decrease in light transmission efficiency in connector 70 that optically connects first light-guiding member 50 and second light-guiding member 60.

In addition, in light-emitting device 1 according to the embodiment, connector 70 further includes case 71 that houses NA converting member 73. Case 71 has a tubular body shape having unclosed ends, and the secondary light passes through an inside of case 71. First light-guiding member 50 is inserted in one end of case 71, and is removably fixed to case 71. Second light-guiding member 60 is inserted in the other end of case 71, and is removably fixed to case 71.

Furthermore, light-emitting device 1 according to the embodiment further includes: ferrule 151 (first ferrule) attached on an exit face 52 side of first light-guiding member 50; and ferrule 161 (second ferrule) attached on an entrance face 61 side of second light-guiding member 60. In addition, first light-guiding member 50 and ferrule 151 are fixed to the one end of case 71, and second light-guiding member 60 and ferrule 161 are fixed to the other end of case 71.

Variation

The present disclosure has been described according to the embodiments, yet the present disclosure is not limited to such embodiments.

For example, in the light-emitting device according to the embodiments, the excitation light source need not include the prism, the condenser lens, the first glass rod, the wavelength converting member, and the second glass rod. Furthermore, the excitation light source need not house, in the case, the prism, the condenser lens, the first glass rod, the wavelength converting member, and the second glass rod. The prism, the condenser lens, the first glass rod, the wavelength converting member, and the second glass rod are not essential structural elements of the excitation light source.

The present disclosure also encompasses: embodiments achieved by applying various modifications conceivable to those skilled in the art to each embodiment; and embodiments achieved by optionally combining the structural elements and the functions of each embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light-emitting device, comprising:
   a solid-state light-emitting element that radiates blue-based light as primary light;
   a wavelength converting member that emits secondary light, the secondary light including wavelength-converted light, the wavelength-converted light being the primary light converted into light having more long-wavelength components than the primary light;
   a first light-guiding member that transmits the secondary light emitted by the wavelength converting member; and
   a second light-guiding member which includes a resin material, and transmits the secondary light transmitted by the first light-guiding member, wherein
   the first light-guiding member and the second light-guiding member are connected by a connector, the connector including a numerical aperture (NA) converting member that optically connects a transmission path in the first light-guiding member and a transmission path in the second light-guiding member.

2. The light-emitting device according to claim 1, wherein the transmission path of the secondary light in the second light-guiding member has a diameter greater than a diameter of the transmission path of the secondary light in the first light-guiding member.

3. The light-emitting device according to claim 1, wherein the second light-guiding member includes a light distribution control structure for performing light distribution control on the secondary light transmitted by the first light-guiding member before emitting the secondary light.

4. The light-emitting device according to claim 3, wherein the light distribution control structure has a hemispherical shape.

5. The light-emitting device according to claim 1, wherein the NA converting member is:
   disposed between an exit face of the first light-guiding member and an entrance face of the second light-guiding member, and
   supported by the connector in an orientation in which the secondary light exited from the exit face of the first light-guiding member is caused to enter the entrance face of the second light-guiding member.

6. The light-emitting device according to claim 1, wherein the connector further includes a case that houses the NA converting member,
   the case has a tubular body shape having unclosed ends, and the secondary light passes through an inside of the case,
   the first light-guiding member is inserted in one end of the case, and is removably fixed to the case, and
   the second light-guiding member is inserted in an other end of the case, and is removably fixed to the case.

7. The light-emitting device according to claim 6 further comprising:
   a first ferrule attached on an exit face side of the first light-guiding member; and
   a second ferrule attached on an entrance face side of the second light-guiding member, wherein
   the first light-guiding member and the first ferrule are fixed to the one end of the case, and
   the second light-guiding member and the second ferrule are fixed to the other end of the case.

* * * * *